US010204059B2

(12) United States Patent
Bain et al.

(10) Patent No.: US 10,204,059 B2
(45) Date of Patent: Feb. 12, 2019

(54) MEMORY OPTIMIZATION BY PHASE-DEPENDENT DATA RESIDENCY

(71) Applicant: International Business Machines Corporation, Armonk, NY (US)

(72) Inventors: Peter D. Bain, Ottawa (CA); Peter D. Shipton, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 15/279,933

(22) Filed: Sep. 29, 2016

(65) Prior Publication Data

US 2018/0089105 A1    Mar. 29, 2018

(51) Int. Cl.
*G06F 3/06* (2006.01)
*G06F 12/12* (2016.01)
*G06F 9/455* (2018.01)

(52) U.S. Cl.
CPC ............ *G06F 12/12* (2013.01); *G06F 3/0611* (2013.01); *G06F 3/0647* (2013.01); *G06F 3/0685* (2013.01); *G06F 9/45558* (2013.01); *G06F 2009/45583* (2013.01); *G06F 2212/70* (2013.01)

(58) Field of Classification Search
USPC ........................................................ 711/159
See application file for complete search history.

(56) References Cited

U.S. PATENT DOCUMENTS

| | | | |
|---|---|---|---|
| 8,352,705 B2 | 1/2013 | Agesen | |
| 8,443,156 B2 | 5/2013 | Adams et al. | |
| 2004/0034850 A1* | 2/2004 | Burkhardt | G06F 8/65 717/120 |
| 2006/0282612 A1* | 12/2006 | Ikeda | G11B 20/10 711/111 |
| 2007/0089146 A1 | 4/2007 | Ikeda et al. | |
| 2007/0255713 A1* | 11/2007 | Li | G06Q 10/06 |
| 2007/0282801 A1* | 12/2007 | Apte | G06Q 10/06 |
| 2008/0120129 A1* | 5/2008 | Seubert | G06Q 10/06 705/35 |
| 2008/0147703 A1* | 6/2008 | Behnen | G06F 9/44505 |
| 2008/0263277 A1* | 10/2008 | Matsunami | G06F 3/0608 711/117 |

(Continued)

OTHER PUBLICATIONS

Breecher, Jerry, "Operating Systems Virtual Memory, 9", Dec. 13, 2015, http://www.docfoc.com/9-virtual-memory1-jerry-breecher-operating-systems-virtual-memory, 28 pages.

(Continued)

*Primary Examiner* — Mano Padmanabhan
*Assistant Examiner* — Jean C Edouard
(74) *Attorney, Agent, or Firm* — Nicholas D. Bowman; Maxine L. Barasch; Keohane & D'Alessandro PLLC

(57) ABSTRACT

Embodiments of the present invention provide memory optimization by phase-dependent data residency. Application programs are profiled a priori or in real time for temporal memory usage. Memory regions such as initialization data are proactively removed from memory when the application transitions to a new phase. A hypervisor monitors application activity and coordinates the removal of memory regions that are no longer needed by the application. Additionally, memory regions that are anticipated to be needed in the future are proactively preloaded.

20 Claims, 7 Drawing Sheets

(56) References Cited

U.S. PATENT DOCUMENTS

| | | | |
|---|---|---|---|
| 2011/0055286 A1* | 3/2011 | Hailpern | G06F 17/30528 |
| | | | 707/804 |
| 2012/0030667 A1* | 2/2012 | Bowyer | G06F 8/61 |
| | | | 717/174 |
| 2013/0007409 A1 | 1/2013 | Ganesh et al. | |
| 2013/0232480 A1* | 9/2013 | Winterfeldt | G06F 8/60 |
| | | | 717/177 |
| 2014/0358868 A1* | 12/2014 | Costecalde | G06F 17/30303 |
| | | | 707/692 |
| 2015/0033038 A1 | 1/2015 | Goss et al. | |
| 2015/0081832 A1* | 3/2015 | Handa | G06F 15/167 |
| | | | 709/213 |
| 2015/0261686 A1 | 9/2015 | Nampoothiri et al. | |

OTHER PUBLICATIONS

Edouard, Jean C., U.S. Appl. No. 16/169,066, Notice of Allowance and Fees Due, dated Dec. 6, 2018, CA920160101US02, 15 pages.

* cited by examiner

MEMORY OPTIMIZATION BY PHASE-DEPENDENT DATA RESIDENCY

FIELD OF THE INVENTION

The present invention relates generally to computing, and more particularly, to memory optimization in a computing environment.

BACKGROUND

In modern computing systems, the memory management subsystem is one of the most important parts of the operating system (OS). Virtual memory is a technique implemented within the memory management subsystem to allow applications to access more memory than the physical memory that actually exists in a computing system. In order to accomplish this, the memory management subsystem provides a translation or address mapping mechanism to map the virtual address space into the physical address space.

A typical OS manages and controls a number of processes concurrently. Every process has its own virtual address space. These virtual address spaces are usually separate from each other to prevent overlapping program or data. The OS maintains a page table to store the mapping information for each process. When the memory usage increases due to multiple applications running concurrently, the overhead of managing virtual address mappings can become a significant performance limiter in large computer systems. It is therefore desirable to have improvements in memory optimization within a computing environment.

SUMMARY

Embodiments of the present invention provide memory optimization by phase-dependent data residency. Application programs are profiled a priori or in real time for temporal memory usage. Memory regions such as initialization data are proactively removed from physical memory when the application transitions to a new phase. A hypervisor monitors application activity and coordinates the removal of memory regions that are no longer needed by the application. Additionally, memory regions that are anticipated to be needed in the future are proactively preloaded.

In one aspect, embodiments include a computer-implemented method for memory optimization in a computing device, comprising: identifying phases in a lifecycle of a software application; in response to the identifying of the phases in the lifecycle of the software application, identifying portions of reference data required during one or more phases of the lifecycle of the software application; detecting a phase transition of the lifecycle from a previous phase to a new phase; and in response to the detecting, unloading memory-resident portions of the reference data, which are not required during the new phase.

In another aspect, embodiments include a computer system comprising: a processor; a memory coupled to the processor, the memory containing instructions, that when executed by the processor, perform the steps of: identifying phases in a lifecycle of a software application; in response to the identifying of the phases in the lifecycle of the software application, identifying portions of reference data required during one or more phases of the lifecycle of the software application; detecting a phase transition of the lifecycle from a previous phase to a new phase; and in response to the detecting, unloading memory-resident portions of the reference data, which are not required during the new phase.

In yet another aspect, embodiments include a computer program product for memory optimization in an electronic computing device comprising: a computer readable storage medium having program instructions embodied therewith, the program instructions executable by a processor to cause the electronic device to: identify phases in a lifecycle of a software application; in response to the identifying of the phases in the lifecycle of the software application, identify portions of reference data required during one or more phases of the lifecycle of the software application; detect a phase transition of the lifecycle from a previous phase to a new phase; and in response to the detecting, unload memory-resident portions of the reference data, which are not required during the new phase.

BRIEF DESCRIPTION OF THE DRAWINGS

Features of the disclosed embodiments will be more readily understood from the following detailed description of the various aspects of the invention taken in conjunction with the accompanying drawings.

Figure 1:
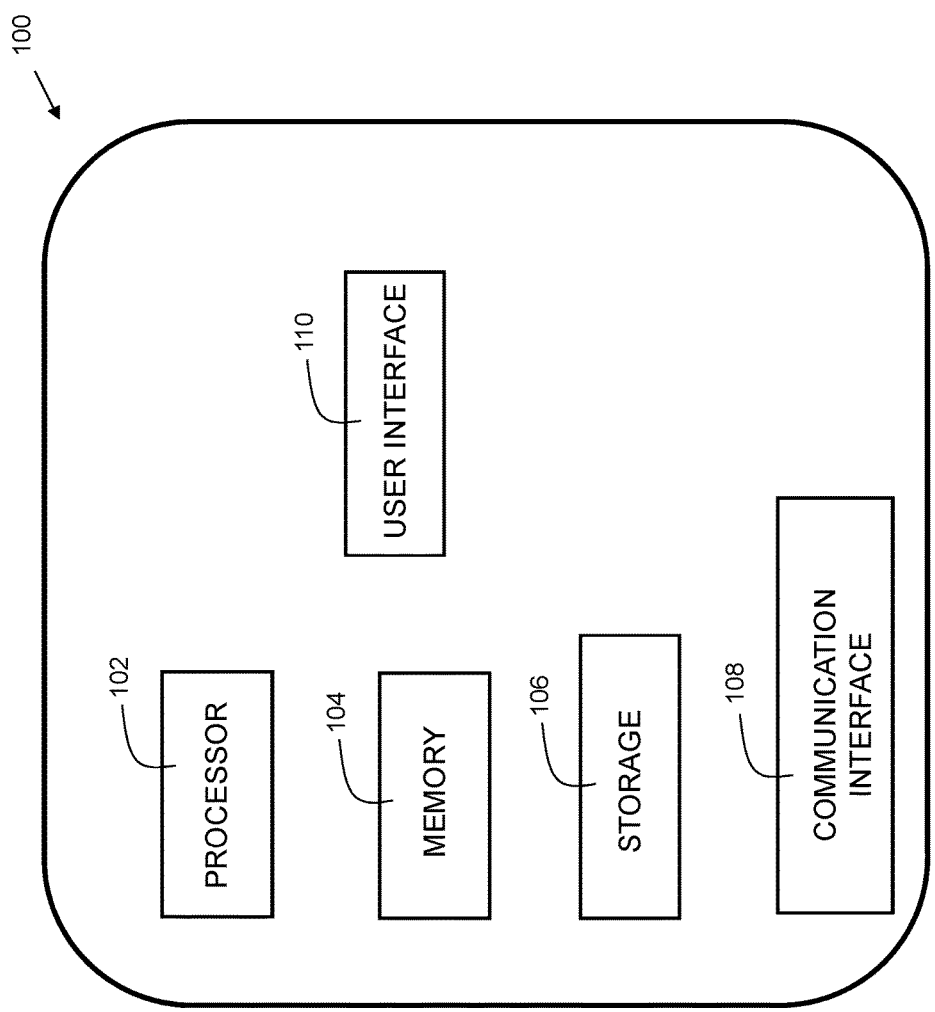
FIG. 1 is a system block diagram for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Embodiments of the present invention provide memory optimization by phase-dependent data residency. Application programs are profiled a priori or in real time for temporal memory usage. Memory regions such as initialization data are proactively removed from physical memory when the application transitions to a new phase. A hypervisor monitors application activity and coordinates the removal of memory regions that are no longer needed by the application. Additionally, memory regions that are anticipated to be needed in the future are proactively preloaded.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is a system block diagram for embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se.

Device 100 further includes storage 106. In embodiments, storage 106 may include one or more magnetic storage devices such as hard disk drives (HDDs). Storage 106 may additionally include one or more solid state drives (SSDs). In embodiments, the HDDs may include ATA, SATA, and/or IDE drives. In some embodiments, the HDDs may be configured in a RAID configuration.

The memory 104 and storage 106 together provide memory for multiple applications to execute on processor 102. In embodiments, device 100 may have multiple processors 102, and/or multiple cores per processor. The device 100 may execute an operating system that provides virtual memory management for the device 100. The processor 102 may have one or more cache memories therein. Together, the cache memories, physical memory 104, and storage 106 enable an application to access more memory space than what is available in physical memory 104.

Device 100 further includes a user interface 110, examples of which include a liquid crystal display (LCD), a plasma display, a cathode ray tube (CRT) display, a light emitting diode (LED) display, an organic LED (OLED) display, or other suitable display technology. The user interface 110 may further include a keyboard, mouse, or other suitable human interface device. In some embodiments, user interface 110 may be a touch screen, incorporating a capacitive or resistive touch screen in some embodiments.

The device 100 further includes a communication interface 108. The communication interface 108 may be a wired communication interface that includes Ethernet, Gigabit Ethernet, or the like. In embodiments, the communication interface 108 may include a wireless communication interface that includes modulators, demodulators, and antennas for a variety of wireless protocols including, but not limited to, Bluetooth™, Wi-Fi, and/or cellular communication protocols for communication over a computer network.

Figure 2:
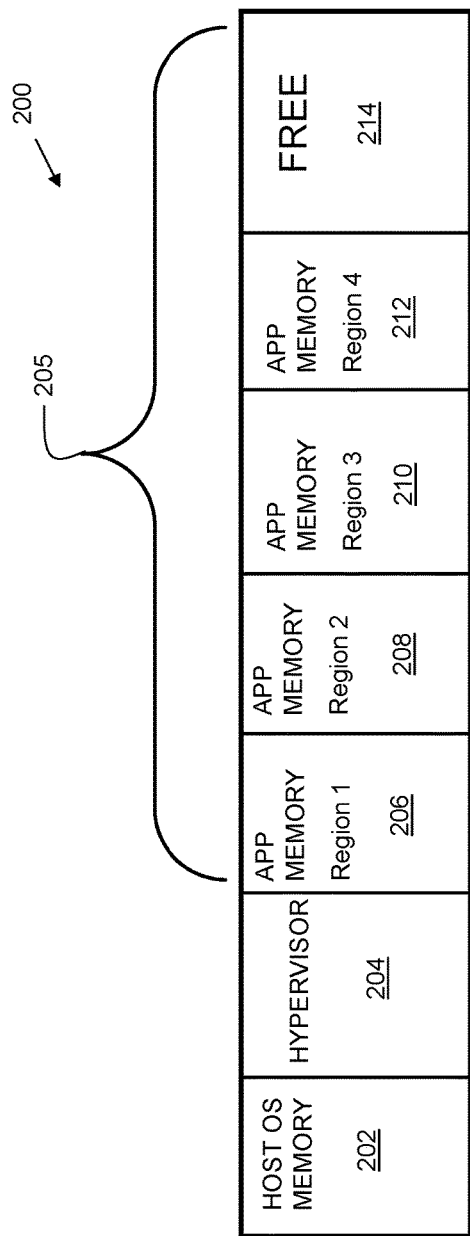
FIG. 2 is an exemplary memory allocation diagram.

FIG. 2 is an exemplary memory allocation diagram. Physical memory 200 is divided into multiple regions. Region 202 is dedicated to the host operating system memory. Region 204 is dedicated to a hypervisor that executes on the processor 102 of the device 100 and monitors application phases and memory regions. In some embodiments, the hypervisor monitors memory access of the memory regions by applications. Region 205 is dedicated to use by applications. In the example, an application is using four memory regions within application region 205, indicated by reference numbers 206, 208, 210, and 212. These regions contain reference data for a software application. Thus, regions 206, 208, 210, and 212 are memory-resident portions of the reference data. Region 214 is currently unused, and is indicated as free.

Figure 3:
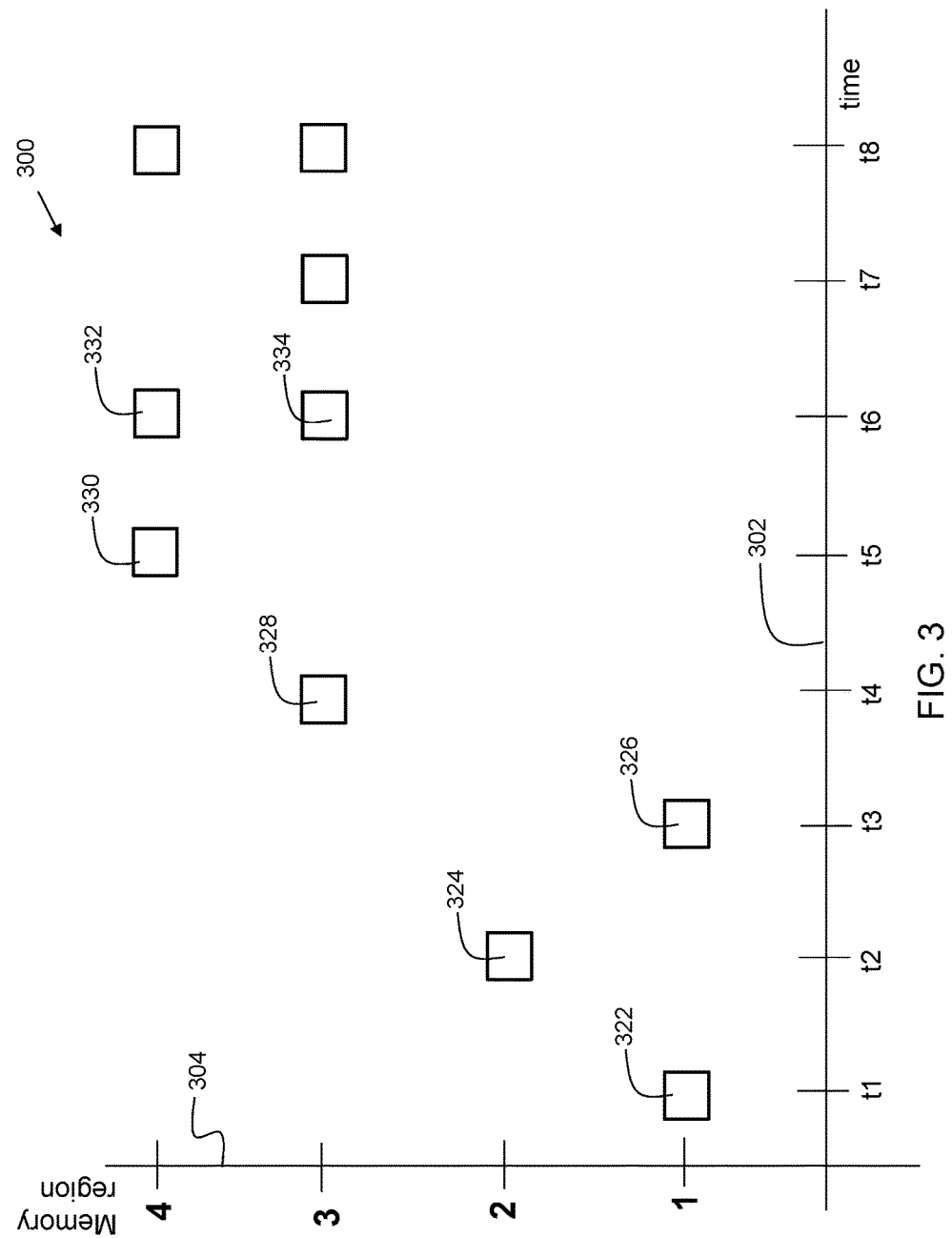
FIG. 3 is an exemplary temporal allocation chart.

FIG. 3 is an exemplary temporal allocation chart 300. The horizontal axis 302 indicates various points in the execution of an application. The vertical axis 304 indicates memory application regions. In the example chart of FIG. 3, there are four memory application regions, corresponding to the four regions (206, 208, 210, and 212) shown in FIG. 2. While four memory regions are shown in the example of FIG. 2 and FIG. 3, in practice, there can be many more (or fewer) memory regions. The times t1-t8 indicate times of various phases of an application. Time t1 begins an initialization phase. As denoted by point 322 on chart 300, at time t1, the application is using memory in memory region 1 (206 of FIG. 2). At time t2, as denoted by point 324 on chart 300, the application is using memory in region 2. At time t3, as denoted by point 326 on chart 300, the application is again using memory in region 1. Thus, in embodiments, identifying phases in a lifecycle of a software application includes identifying initialization data. The initialization data can include Java classes. In embodiments, the initialization data can also include profile results and/or just-in-time compiled Java methods. After time t3, the application does not use memory from region 1 or region 2 anymore. Thus, detecting a phase transition of the lifecycle from a previous phase to a new phase comprises detecting a first memory access in a region of memory by the software application. That is, the first time the application accesses memory from region 3, embodiments identify that memory regions 1 and 2 are no longer needed, and can be freed. At time t4, as denoted by point 328 on chart 300, the application is using memory in region 3. At time t5, as denoted by point 330 on chart 300, the application is using memory in region 4. At time t6, as denoted by point 332 and point 334 on chart 300, the application is using memory in both region 3 and region 4. After time t6, the application continues using region 3 and/or region 4.

In embodiments, a hypervisor may monitor the memory access pattern of the application and build a historical usage pattern. After multiple executions, for example, after ten executions, the hypervisor can utilize discerned patterns to perform memory optimization. For example, after time t3, memory regions 1 and 2 are no longer used. Thus, the hypervisor can proactively remove these regions from physical memory. That is, the hypervisor can indicate that these regions are free and can be used for other purposes, such as by other applications, or new data required by the current application. By proactively freeing those regions, the typical performance hit that occurs when virtual memory swapping is required can be alleviated. With embodiments of the present invention, the amount of free memory is increased, which reduces the frequency of virtual memory swapping (where information from storage 106 is transferred to memory 104), thereby improving overall system performance.

Additionally, the hypervisor can identify, using historical data, that after time t4, the next memory region to be accessed is region 4 (point 330). Thus, at time t4, in embodiments, the hypervisor can preload memory region 4 so that it is resident in physical memory before time t5. That is, embodiments include preloading nonresident portions which are needed during the new phase. The preloading involves proactively transferring data from storage 106 to memory 104 before the application actually requests it. This eliminates the need for a virtual memory swap operation at time t5, thereby improving overall system performance. In some embodiments, at time t3, the hypervisor can preload both memory region 3 and the subsequent memory region 4 to further optimize performance. Thus, embodiments include preloading nonresident portions which are needed during a subsequent phase that follows the new phase.

In some embodiments, the hypervisor determines the current phase of the application based on its memory access pattern. In the example of FIG. 3, the hypervisor can determine that at time t4, the application has transitioned from the initialization phase to a new phase, and the previously used data of memory regions 1 and 2 are no longer needed and can be proactively removed from physical memory. Without embodiments of the present invention, memory regions 1 and 2 would remain active until more application memory was required than available, at which time the virtual memory manager would perform a swap. This is a performance hit for the system. By proactively removing and/or preloading memory regions based on the phase of the application, the number of virtual memory manager swaps is reduced and performance is improved.

In some embodiments, the phase identification can be performed empirically. For example, the behavior of an application can be monitored using instrumentation (such as JTAG tools), debug logging, and/or other memory monitoring tools. In some embodiments, the instrumentation can include instrumenting accessor functions to record areas accessed in phase-specific logs, which can be processed either online at the end of a phase or post processed offline. Alternatively, pages/sections of reference data within memory regions can be marked as "no access" and an exception handler can be used to capture and record access attempts to characterize the application behavior. An initialization transition time can be determined. Then, a predetermined margin time can be added to the initialization transition time. At a time equivalent to the initialization transition time plus the predetermined margin time, the application can be assumed to have exited the initialization phase, and memory regions associated with the initialization phase can be freed. For example, if it is determined that the initialization of a program typically completes within four minutes, a predetermined margin time of three minutes can be established. Thus, after seven minutes, it can be assumed that the application initialization has completed. At that time, the initialization memory regions are proactively freed. In this type of embodiment, there is no need for monitoring memory access to infer the application phase. Instead, execution time is used to determine the application phase. In the aforementioned example, once the application has been executing for more than seven minutes, it is assumed to be in a post-initialization phase, and the initialization memory can be freed.

In some embodiments, the phase identification can be communicated by the application to the hypervisor. For example, the application can write its current status to a temporary file, pipe, or send a message on an interprocess communication bus (e.g. such as Dbus). The hypervisor can be configured to receive the interprocess communication messages, or receive data from the pipe and/or temporary file to ascertain the current application phase.

Regardless of how the current application phase is determined, once it is determined that the application has transitioned from a previous phase to a new phase, the physical memory regions associated with the previous phase are relinquished. Additionally, memory regions that are associated with the new phase and/or a subsequent phase (that follows after the new phase) can be preloaded to further improve the computer system performance.

Figure 4A:
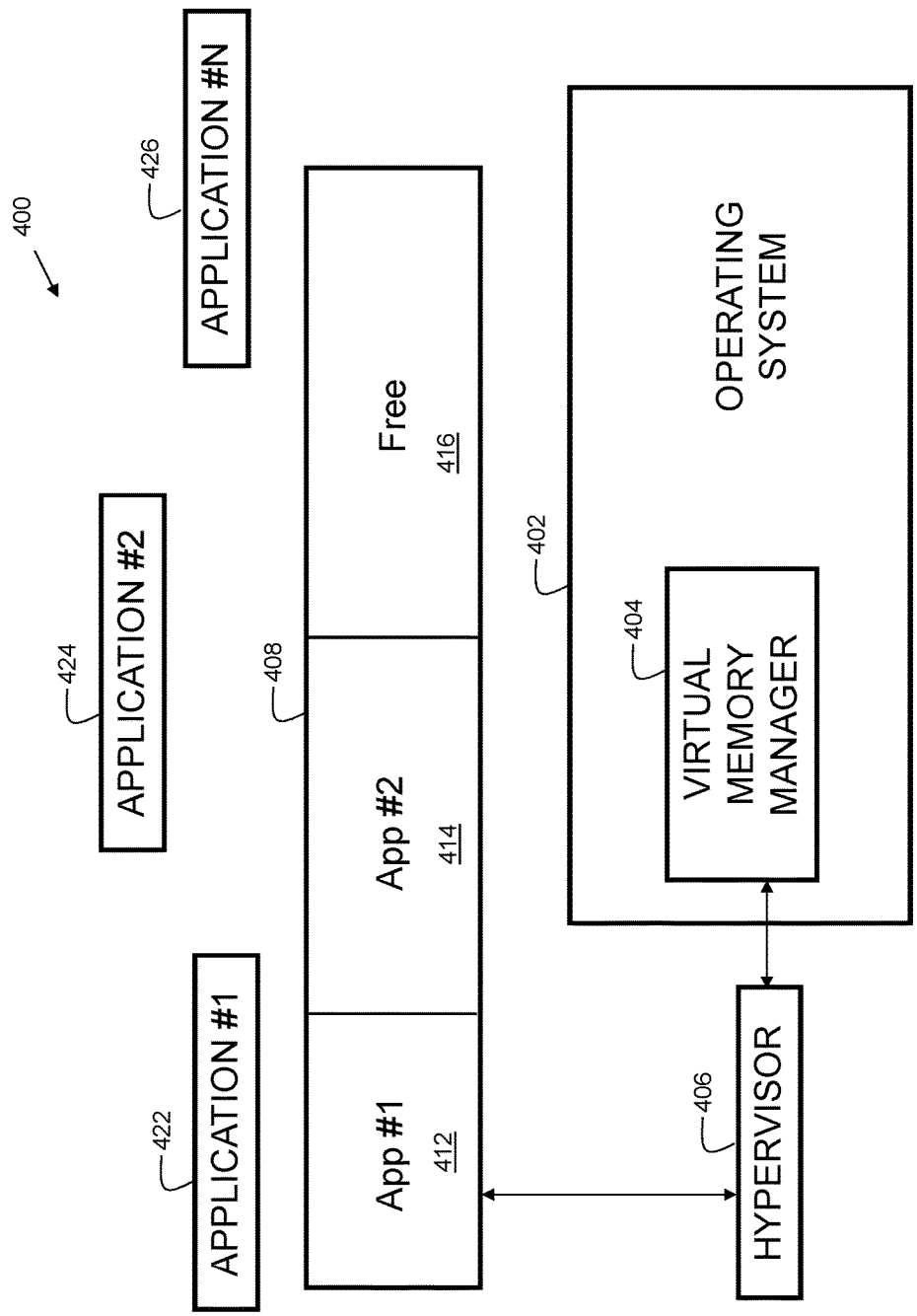
FIGS. 4A-4C show operation of embodiments of the present invention.
Figure 4B:
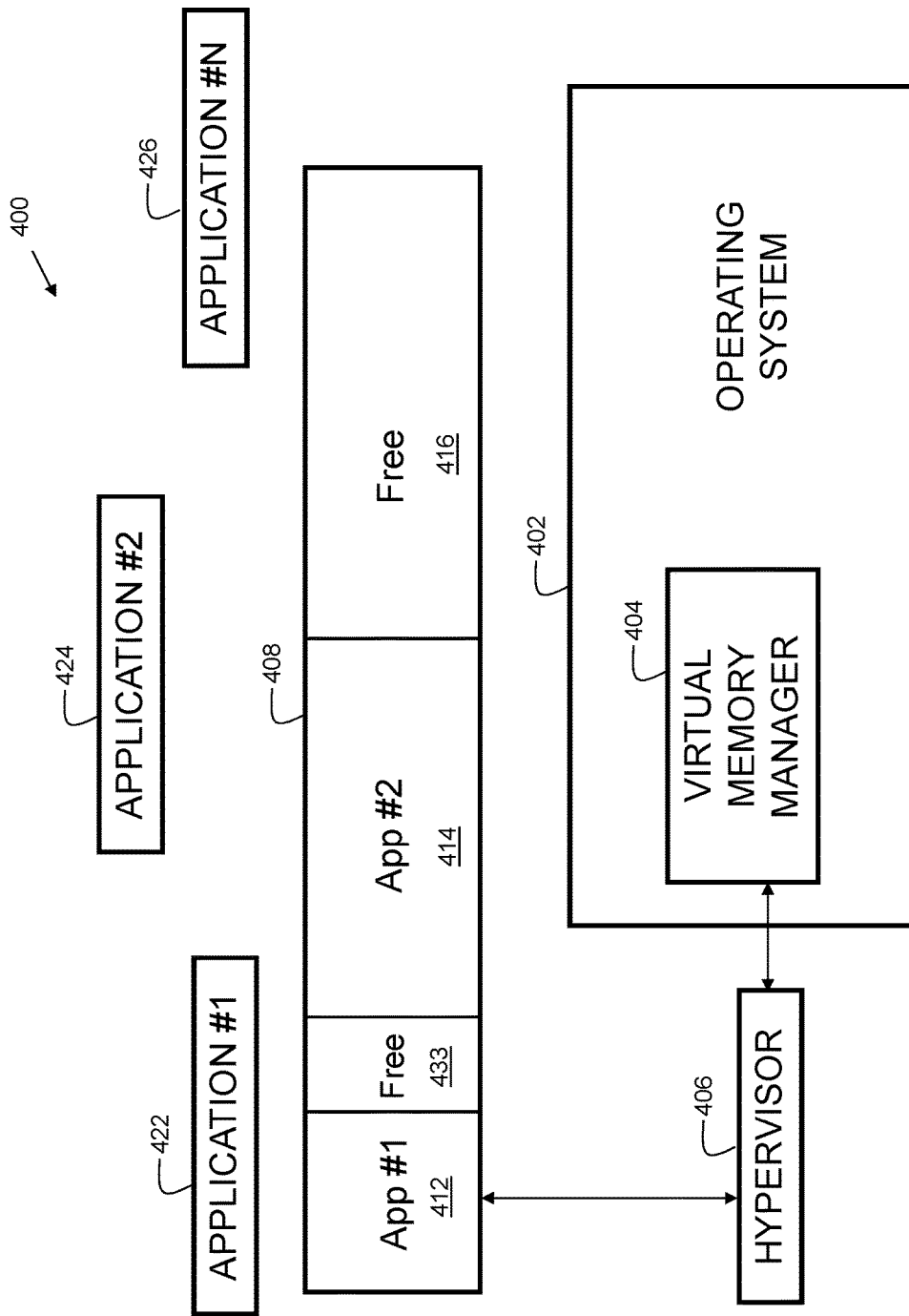
Figure 4C:
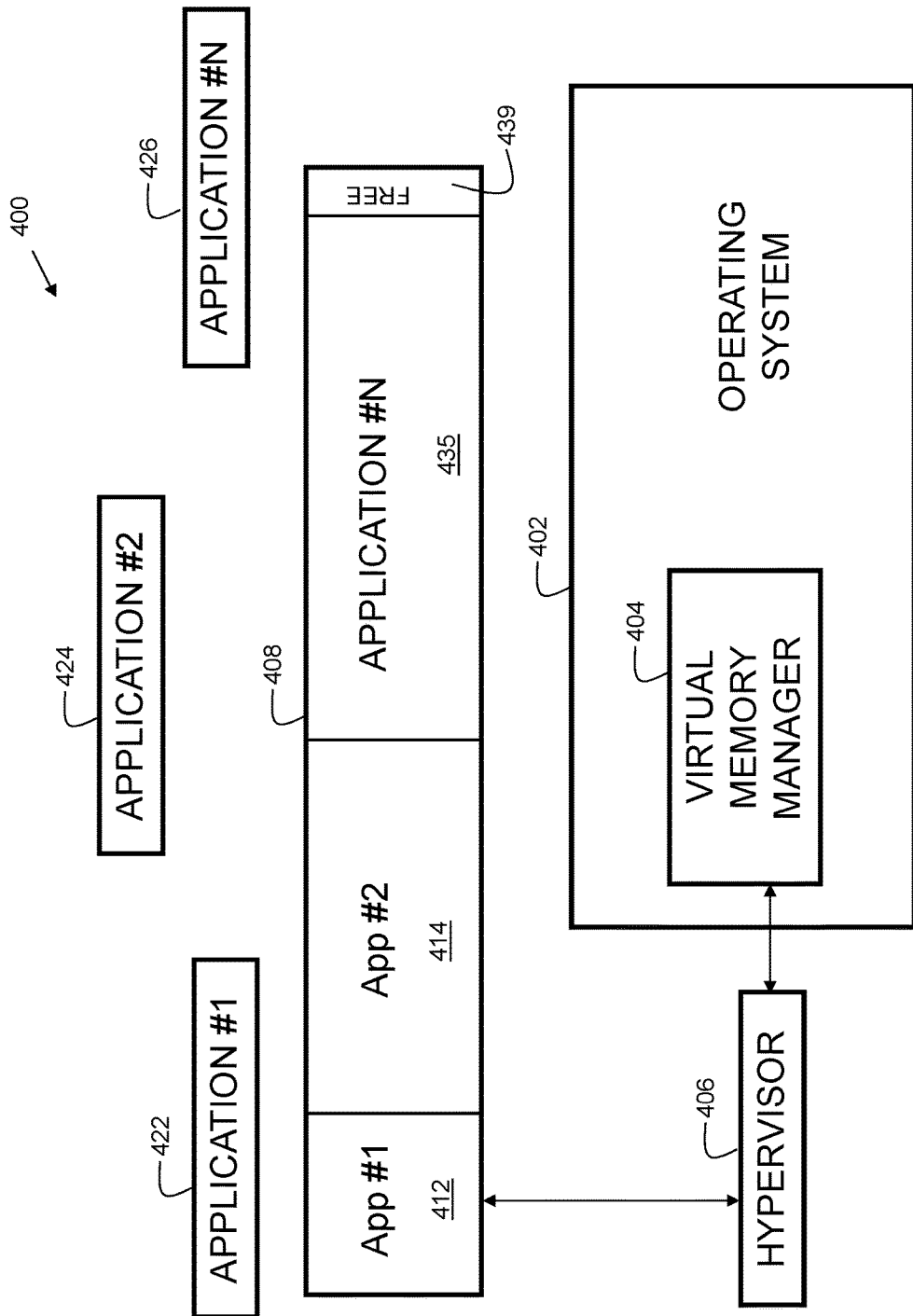

FIGS. 4A-4C show operation of embodiments of the present invention. FIGS. 4A-4C show a block diagram of memory at various phases of an application. In FIG. 4A, an operating system 402 is shown. The operating system provides support for Input/Output (I/O), file support, and peripherals, as is known in the art. Additionally, the operating system 402 comprises a virtual memory manager 404. The virtual memory manager 404 may implement a system of pages and/or segments, and may interface with a memory management unit (MMU) within the processor 102. The virtual memory manager 404 may maintain tables of segments, mappings between copies of data on disk (storage 106), and corresponding copies of that data in memory (104).

The hypervisor 406 is a program that operates on the device, and communicates with the virtual memory manager 404, and may monitor the memory usage and/or execution phase of multiple applications. The hypervisor 406 may send messages to the virtual memory manager 404 to communicate which regions of memory can be unloaded. Thus, in embodiments, unloading memory-resident portions of the reference data comprises sending a message to a host operating system. In FIGS. 4A-4C, there are three applications, indicated as application #1 (422), application #2 (424), and application #N (426). While three applications are shown in the example, in practice N can be much higher, where hundreds or even thousands of current applications are executing.

Memory 408 indicates three regions. Region 412 pertains to data for application #1, region 414 pertains to data for application #2, and region 416 is currently free (unused by any application). In this example, FIG. 4A pertains to a scenario where application #1 is in the initialization phase, application #2 is in a steady state phase, and application #N has not yet been started.

Referring now to FIG. 4B, the diagram 400 now depicts a case where application #1 has completed initialization and transitioned to a new post-initialization phase. Initialization data for application #1 has been freed, resulting in free region 433. Thus, in FIG. 4B, there is more free space available than in FIG. 4A.

Referring now to FIG. 4C, the diagram now depicts a case where application #N is started, and occupies region 435. In this situation, most of memory 408 is in use, with small free area 439 remaining. Because the hypervisor 406 proactively removed the initialization memory regions as shown in FIG. 4B, the application #N memory region 435 was able to be loaded into memory 408 without the need for virtual memory swapping, thereby improving computer performance.

Note that for simplicity, FIG. 4C shows a defragmented view, where free region 433 has been combined with free region 416 prior to loading the memory region 435 of application #N. In practice, the virtual memory manager and/or the hypervisor may perform a defragmentation. In other embodiments, the memory may remain discontinuous within physical memory 408, but remain exposed as continuous to the applications (422, 424, and 426) by the virtual memory manager 404.

In embodiments, the hypervisor may be a virtual machine manager. The virtual machine manager may enable multiple instances of a guest operating system to be executing on a host operating system. For example, multiple Linux distributions may be executing on a machine executing a native Microsoft Windows® operating system. As the various Linux distributions complete their boot/initialization sequence, the hypervisor can free memory regions that are no longer needed to improve the overall performance of the host operating system. In some embodiments, the host operating system can be a Linux operating system, and the various guest operating systems can also include Linux distributions, Windows® versions, and/or other operating systems. Thus, in embodiments, the host operating system comprises a Linux operating system. In a Linux host embodiment, page tables are available via the "pagemap" pseudo-file in the/proc file system. The dynamically measured statistics may be used to reorganize, either manually or via software, the reference data into contiguous sections corresponding to the various phases. At the end of a phase, a process (e.g., either a hypervisor, or the application itself) advises the operating system to unload (or preload) certain memory regions of the reference data. Referring again to Linux host embodiments, the "madvise" function can be used to unload a range of pages. In some Linux host embodiments, application phase information can be inferred by observing memory footprint changes in the Linux "smaps" pseudo-file or using the Linux "strace" command to find calls to "madvise".

Similarly, Microsoft Windows® and other operating systems have memory profiling tools available that can be used to characterize temporal memory access behavior over the lifecycle of an application. Thus, regardless of the host operating system, embodiments of the present invention can be used to improve performance in a multi-application computing environment.

In embodiments, the hypervisor may be a Java™ virtual machine. The Java virtual machine can remove and/or preload Java classes as needed based on the application phase, thereby improving performance of the computing system. In some embodiments, the hypervisor may be another language runtime.

In some embodiments, instead of a hypervisor, the application itself may perform the actions needed to proactively remove unneeded areas from physical memory. In some embodiments, an application server may be used to perform the actions needed to proactively remove unneeded areas from physical memory.

Figure 5:
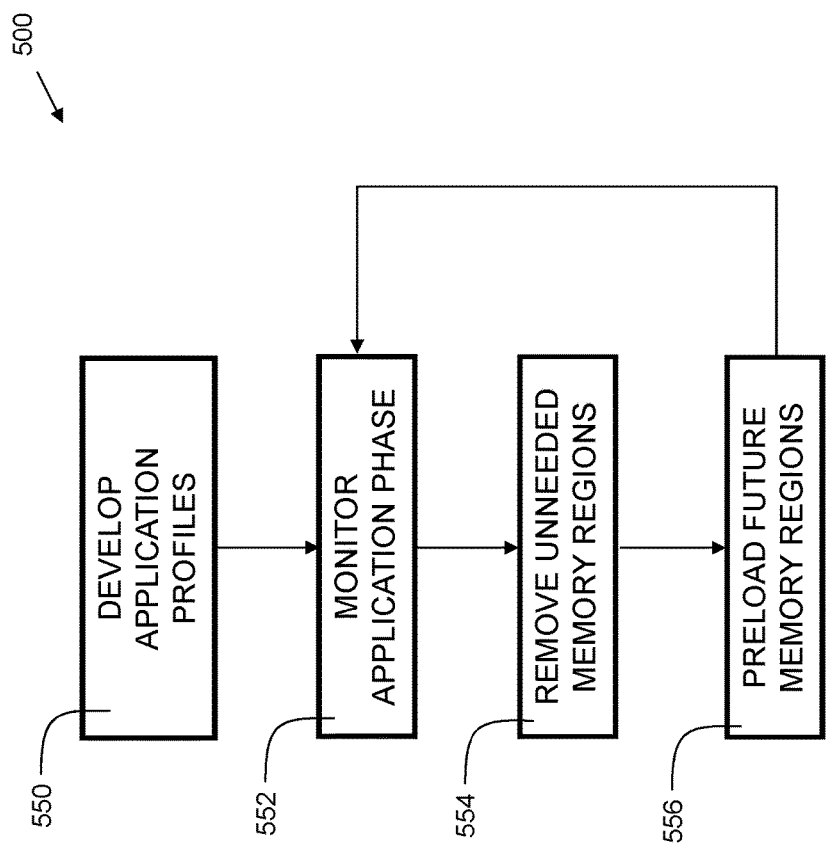
FIG. 5 is a flowchart for embodiments of the present invention.

FIG. 5 is a flowchart 500 for embodiments of the present invention. At process step 550, application profiles are developed. These can be developed a priori by inspection, or determined in real time based on application behavior and/or memory usage. The profiles indicate what memory regions are used in a corresponding phase of the application. Application phases can include, but are not limited to, initialization, configuration, steady state, maintenance, suspending, suspended, resuming, and/or shutting down. In process step 552, the application phase is monitored. This can be performed by the hypervisor monitoring the application memory usage, communication from the application regarding its state, and/or monitoring of the execution time of the application program. At process step 554, unneeded memory regions are removed from physical memory. This frees up additional physical memory to reduce the occurrence of virtual memory swapping. In process step 556, future memory regions are preloaded. This improves performance by having those regions loaded prior to when they are needed by the application. In the event that the hypervisor removes a memory region that turns out to be needed by the application at a later time, the virtual memory manager simply performs a swap to restore that region. Thus, no significant harm occurs if the hypervisor should occasionally remove a region that is needed later. However, in the interest of optimization, it is preferable to minimize such occurrences.

As can now be appreciated, embodiments provide improved performance by memory optimization based on phase-dependent data residency of applications. While the aforementioned examples include virtual machine managers and Java virtual machines, embodiments of the present invention can be applied to a wide variety of applications. These include, but are not limited to, other types of applications which have large amounts of read-only data, such as databases, data mining applications, and scientific computations.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for memory optimization in a computing device, comprising:
    identifying phases in a lifecycle of a software application;
    in response to the identifying of the phases in the lifecycle of the software application, identifying portions of reference data required during one or more phases of the lifecycle of the software application;
    detecting a phase transition of the lifecycle from a previous phase to a new phase;
    in response to the detecting, unloading memory-resident portions of the reference data, which are not required during the new phase;
    determining at least one pattern in memory usage based on repetition of the detecting and unloading steps; and
    in response to the determining, unloading memory-resident portions of the reference data, which are not required before a phase transition predicted by the pattern.

2. The method of claim 1, further comprising preloading nonresident portions which are needed during the new phase.

3. The method of claim 1, further comprising preloading nonresident portions which are needed during a subsequent phase that follows the new phase.

4. The method of claim 1, wherein the identifying of the phases in the lifecycle of the software application includes identifying initialization data.

5. The method of claim 4, wherein the initialization data includes Java classes.

6. The method of claim 1, wherein the detecting comprises detecting a first memory access in a region of memory by the software application.

7. The method of claim 1, wherein the unloading of the memory-resident portions of the reference data comprises sending a message to a host operating system.

8. The method of claim 7, wherein the host operating system comprises a Linux operating system.

9. A computer system comprising:
    a processor;
    a memory coupled to the processor, the memory containing instructions, that when executed by the processor, perform the steps of:
    identifying phases in a lifecycle of a software application;
    in response to the identifying of the phases in the lifecycle of the software application, identifying portions of reference data required during one or more phases of the lifecycle of the software application;
    detecting a phase transition of the lifecycle from a previous phase to a new phase;
    in response to the detecting, unloading memory-resident portions of the reference data, which are not required during the new phase;
    determining at least one pattern in memory usage based on repetition of the detecting and unloading steps; and
    in response to the determining, unloading memory-resident portions of the reference data, which are not required before a phase transition predicted by the pattern.

10. The system of claim 9, wherein the memory further contains instructions, that when executed by the processor, perform the step of preloading nonresident portions which are needed during the new phase.

11. The system of claim 9, wherein the memory further contains instructions, that when executed by the processor, perform the step of preloading nonresident portions which are needed during a subsequent phase that follows the new phase.

12. The system of claim 9, wherein the memory further contains instructions, that when executed by the processor, perform the step of identifying initialization data.

13. The system of claim 12, wherein the memory further contains instructions, that when executed by the processor, perform the step of identifying initialization data that includes Java classes.

14. The system of claim 9, wherein the memory further contains instructions, that when executed by the processor, perform the detecting by detecting a first memory access in a region of memory by the software application.

15. The system of claim 9, wherein the memory further contains instructions, that when executed by the processor, perform the step of unloading memory-resident portions of the reference data by sending a message to a host operating system.

16. A computer program product for memory optimization in an electronic computing device comprising a computer readable storage medium having program instructions embodied therewith, the program instructions executable by a processor to cause the electronic device to:
   identify phases in a lifecycle of a software application;
   in response to the identifying of the phases in the lifecycle of the software application, identify portions of reference data required during one or more phases of the lifecycle of the software application;
   detect a phase transition of the lifecycle from a previous phase to a new phase;
   in response to the detecting, unload memory-resident portions of the reference data, which are not required during the new phase;
   determine at least one pattern in memory usage based on repetition of the detecting and unloading steps; and
   in response to the determining, unload memory-resident portions of the reference data, which are not required before a phase transition predicted by the pattern.

17. The computer program product of claim 16, further comprising program instructions executable by the processor to cause the electronic computing device to perform the step of preloading nonresident portions which are needed during the new phase.

18. The computer program product of claim 16, further comprising program instructions executable by the processor to cause the electronic computing device to perform the step of preloading nonresident portions which are needed during a subsequent phase that follows the new phase.

19. The computer program product of claim 16, further comprising program instructions executable by the processor to cause the electronic computing device to perform the step of identifying initialization data.

20. The computer program product of claim 16, further comprising program instructions executable by the processor to cause the electronic computing device to perform the detecting by detecting a first memory access in a region of memory by the software application.

* * * * *